United States Patent

McGeachy

[15] 3,661,168
[45] May 9, 1972

[54] OVERRIDE CONTROL FOR PNEUMATIC VALVES

[72] Inventor: Donald E. McGeachy, Highland, Mich.

[73] Assignee: Numatics, Incorporated, Highland, Mich.

[22] Filed: Aug. 6, 1970

[21] Appl. No.: 61,634

[52] U.S. Cl. ............................................. 137/270, 251/100
[51] Int. Cl. ........................................................ F16k 11/07
[58] Field of Search ................... 137/270, 269, 271; 251/14, 251/60, 62, 92, 93, 100, 105, 259, 285, 290, 284, 90

[56] References Cited

UNITED STATES PATENTS

| 2,757,516 | 8/1956 | Buttolph | 251/14 X |
| 313,249 | 3/1885 | Styne | 251/100 X |
| 2,264,677 | 12/1941 | Oxland | 251/14 |

FOREIGN PATENTS OR APPLICATIONS

| 642,746 | 1/1964 | Belgium | 251/100 |
| 334,050 | 12/1958 | Switzerland | 251/14 |
| 472,235 | 5/1914 | France | 251/100 |
| 1,155,487 | 5/1956 | France | 251/100 |

*Primary Examiner*—M. Cary Nelson
*Attorney*—Barnes, Kisselle, Raisch & Choate

[57] ABSTRACT

An override control for pneumatic valves which permits a valve to be manually actuated by manipulation of a plunger in an end cap of a valve housing, the invention being characterized by a selective positioning arrangement wherein the plunger can be either in a manual no-lock slot where it has strictly an in-and-out function or the plunger may be in a manual lock slot where it can have an out position and an in position at will. A further feature is that the plunger may not be shifted from one condition to another without removing the end cap, thus avoiding accidental change of condition.

4 Claims, 5 Drawing Figures

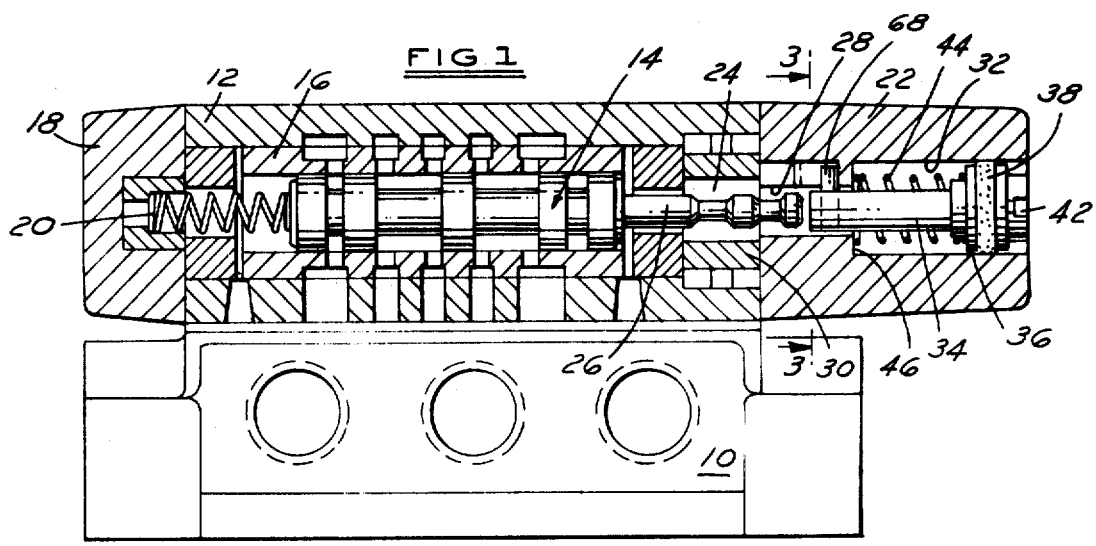
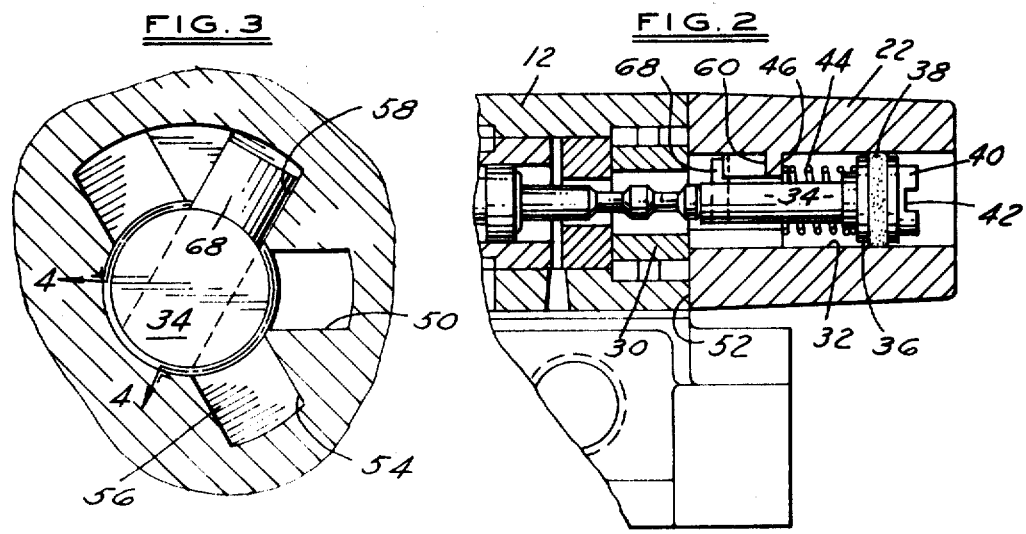
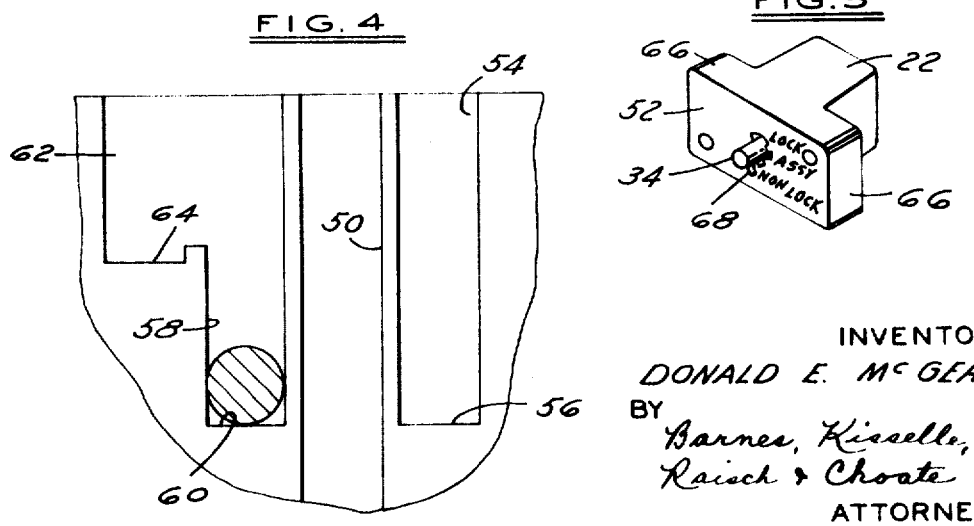
INVENTOR
DONALD E. McGEACHY
BY Barnes, Kisselle,
Raisch & Choate
ATTORNEYS 3,661,168

OVERRIDE CONTROL FOR PNEUMATIC VALVES

This invention relates to an Override Control for Pneumatic Valves.

It is an object of the present invention to provide an override control which can be utilized for what is called manual actuation of valves which are normally in an automatic circuit.

It is an object of the present invention to provide an override control which is shiftable in the field from a simple manual override to a locking override condition wherein the override may be manually actuated or locked in a particular position.

It is a further object of the invention to provide a construction for an override valve control wherein the assembly of the valve is such that it cannot be shifted from one condition to another without a dis-assembly of the parts and the override is locked in one of its selective positions once assembled on the valve.

Other objects and features of the invention relating to details of construction and operation will be apparent in the following description and claims.

DRAWINGS accompany the disclosure and the various views thereof may be briefly described as:

FIG. 1, a view of a valve assembly showing the override plunger in position.

FIG. 2, a view showing the plunger in a selected lock position.

FIG. 3, a sectional view on line 3—3 of FIG. 1.

FIG. 4, a developed view of the control slots of the device.

FIG. 5, a perspective view of the end cap carrying the override plunger.

REFERRING TO THE DRAWINGS

In FIG. 1, a valve assembly is shown with a valve manifold 10 supporting a valve housing 12 in which there is located a valve spool 14 which reciprocates in a sleeve 16 in housing 12. At one end of the housing is an end cap 18 serving as a seat for a spring 20 which urges the valve spool 14 to the right. At the other end of the housing 12 is an end cap 22 which closes the end of the valve to provide what may be a pilot chamber 24 at the end of the valve.

It will be noted that the valve spool 14 has a stem 26 which projects outwardly into a bore 28 in the end cap 22. A spacer ring 30 is contained within the chamber 24 co-axially with the stem. The end cap 22 has at its outer end a bore 32 which joins the bore 28 on the same axis. Slidable within the bore 32 is an override plunger 34 having a head 36 which has an O-ring 38 positioned in a groove in the head, the head terminating in a portion 40 having a screwdriver slot 42.

A spring 44 seats at one end against the head 36 and at the other end against a shoulder 46 at the inner end of the bore 32. On the inner end of the end cap 22 are three slots which surround the bore 28 disposed axially and parallel to each other around this bore. The intermediate slot 50 extends radially from the bore 28 and axially connects the face end 52 of the end cap 22 with the bore 32 at the outer end of the cap. The second slot 54 extends radially from the bore at 28 and axially extends inwardly from the surface 52 but terminates short of the shoulder 46, see FIG. 2, at a shoulder 56. A third slot 58 is located on the other side of the central slot 50 and this extends radially from the bore 28 and axially to a point short of the shoulder 46 to a shoulder 60 (see FIG. 2). Extending circumferentially from a portion of the slot 58 is an arcuate enlargement section 62, the bottom of which has a drop-in recess 64.

These slots are shown in a developed view of the wall of bore 28 in FIG. 4 where the relationship is displayed. The end cap is shown in FIG. 5 where it will be seen that it has side flanges 66 which can be bolted to the valve housing. The shaft 70 of the plunger 34 mounts a radially extending pin 68 (see FIGS. 1 and 2). This pin has a radial length outside the shaft of the plunger 34 which is short of the radial dimension of the slots 50, 54 and 58 so that the pin will slide axially in these slots.

The plunger is assembled by inserting the shaft end into the bore 32 and aligning the pin 68 with the assembly slot 50. The spring 48 is placed around the shaft of the plunger before assembly. The pin and plunger may then be pushed into the end cap so that the end of the plunger protrudes beyond the surface 52 as shown in FIG. 5. The pin then can be turned so that upon retraction by the spring it will enter either the non-lock groove 54 or the lock groove 58.

If the pin, for example, is turned to register with the non-lock groove, it will, upon release of end pressure, enter this groove and the end cap 22 can then be assembled onto the valve housing 12. The stroke of the pin is limited by the valve spool stroke. Thus, the pin cannot be removed from the slot 54 into which it is initially installed. In this position the plunger 34 can be moved in and out to actuate the valve stem 26 at the will of an operator. Upon retraction the spring 44 will retract the plunger until it strikes shoulder 56, and the spring 20 will move the valve 14 to its full right position.

If it is desired to have what is called a "locking" condition, then in assembly the pin 68 will be turned so that it will enter the slot 58 as it is shown in FIG. 3. Then the plunger may have a position of retraction in engagement with the shoulder 60 as viewed in FIG. 1 or in position with the recess 64 as viewed in FIGS. 2 and 3. The pin can be pushed in to actuate the valve stem 28 and then rotated into recess 64 locking the valve in the actuated condition. Again, it will be seen that the pin in assembly will prevent the turning of the plunger to any other slot than slot 58 once assembly is made in that slot and the cap 22 assembled onto the valve housing 12.

I claim:

1. A manual override control for axially movable valves to permit shifting of said valves by an operator without disassembly which comprises:

a. an end cap for a valve housing having an external opening disposed on an axis parallel to that of the valve on which it is to be mounted and having an internal opening co-axial with said external opening with three radially disposed axially aligned slots: a first slot connecting to said external opening, a second slot circumferentially spaced from said first slot blind at one end nearest the exposed opening, and a third slot circumferentially spaced from said first and second slots, blind at one end nearest the exposed opening, and having a circumferential recess extending to one side thereof to provide a lock shoulder, and b. a plunger movable in said recesses from an outward to an inward position having an external end for manual manipulation, an internal end for contacting a movable valve member, and a radial projection between said ends movable through said first slot to an assembly position, and shiftable selectively into said second slot to limit the plunger to axial motion only, and shiftable selectively into said third slot to permit axial motion and rotary motion to a position in contact with the locking shoulder to lock the plunger in an inward position.

2. A manual override control as defined in claim 1 in which said shoulder has a return recess to lock said pin in a selected rotary position.

3. A manual override control as defined in claim 1 in which a valve housing is associated with said end cap, and means on said housing to provide an axial stop for said projection to block movement from said second or third slots after assembly of said end cap on said housing.

4. A manual override control for axially movable valves to permit shifting of said valves by an operator without disassembly which comprises:

a. an end cap having a face to be applied to a valve housing having a bore with an axis leading to said face and having a plurality of slots opening at the end to said face and at one side to said bore, each with a blind end spaced from said face, one of said slots having a circumferential enlargement to provide a stop shoulder spaced from said face, b. a plunger axially and rotatably movable in said bore, and c. means on said plunger positionable and movable selectively in one of said slots to limit the motion of said plunger selectively to axial, and axial and rotatable, wherein, in the latter case, the plunger may be locked at one axial position by engagement of said means with said stop shoulder.

* * * * *